US012441520B2

(12) United States Patent
Davis et al.

(10) Patent No.: US 12,441,520 B2
(45) Date of Patent: Oct. 14, 2025

(54) END CAPS FOR COLLECTIBLE CARD PROTECTIVE HOLDERS

(71) Applicants: Patrick Michael Davis, St. Charles, MO (US); Dylan James Stradtmann, Breckenridge Hills, MO (US)

(72) Inventors: Patrick Michael Davis, St. Charles, MO (US); Katherine Zanitsch, St. Charles, MO (US); Dylan James Stradtmann, Breckenridge Hills, MO (US)

( * ) Notice: Subject to any disclaimer, the term of this patent is extended or adjusted under 35 U.S.C. 154(b) by 177 days.

(21) Appl. No.: 17/751,749

(22) Filed: May 24, 2022

(65) Prior Publication Data

US 2023/0030416 A1   Feb. 2, 2023

Related U.S. Application Data

(60) Provisional application No. 63/226,975, filed on Jul. 29, 2021.

(51) Int. Cl.
*A45C 11/18* (2006.01)
*B65D 43/02* (2006.01)
*B65D 51/24* (2006.01)

(52) U.S. Cl.
CPC .......... *B65D 43/0218* (2013.01); *A45C 11/18* (2013.01); *B65D 51/245* (2013.01); *B65D 2543/00194* (2013.01); *B65D 2543/00518* (2013.01); *B65D 2543/00537* (2013.01); *B65D 2543/00555* (2013.01)

(58) Field of Classification Search
CPC ............. B65D 43/0218; B65D 51/245; B65D 2543/00194; B65D 2543/00518; B65D 2543/00537; B65D 2543/00555; A45C 11/18
USPC ........................................ 206/449, 455, 456
See application file for complete search history.

(56) References Cited

U.S. PATENT DOCUMENTS

| 1,693,622 | A | | 12/1928 | Spaulding | |
|---|---|---|---|---|---|
| 3,773,208 | A | * | 11/1973 | Curry ................ | B65D 43/0218 220/806 |
| 4,322,001 | A | | 3/1982 | Hurley | |
| 4,747,511 | A | * | 5/1988 | Dutt .................... | B65D 51/1683 220/254.1 |
| 4,915,214 | A | * | 4/1990 | Wieder .................... | A47G 1/12 206/0.82 |
| 5,097,953 | A | | 3/1992 | Gingras | |
| 5,121,563 | A | | 6/1992 | Connor et al. | |

(Continued)

OTHER PUBLICATIONS

Product Information on Team Bags Resealable Sleeves; Ultra Pro; available at https://ultrapro.com/products/team-bags-resealable-sleeves-100ct; last visited Aug. 10, 2022; 2 pp.

(Continued)

*Primary Examiner* — Jacob K Ackun

(57) ABSTRACT

An end cap, a collectible card protective assembly, and a storage system generally comprise a cover sized to extend over and close the open end of a collectible card holder, and an engagement member configured to engage the collectible card holder and releasably secure the cover to the collectible card holder. The end cap prevents removal of the collectible card from the pocket when the cover is secured to the collectible card holder by the engagement member.

20 Claims, 15 Drawing Sheets

(56) References Cited

U.S. PATENT DOCUMENTS

| | | | |
|---|---|---|---|
| 5,224,600 A | 7/1993 | Neugebauer | |
| 5,259,136 A | 11/1993 | Goserud | |
| 5,287,641 A | 2/1994 | Showers | |
| 5,358,114 A | 10/1994 | Neugebauer | |
| 5,522,163 A | 6/1996 | Neugebauer | |
| 5,871,092 A * | 2/1999 | Rogers | B65D 11/188 206/769 |
| 6,149,003 A | 11/2000 | Day | |
| 6,276,552 B1 * | 8/2001 | Vervisch | F16K 35/10 220/315 |
| 7,055,690 B1 | 6/2006 | Valdez et al. | |
| 8,708,184 B2 * | 4/2014 | Thurlow | A47J 36/04 220/573.1 |
| 11,735,069 B1 * | 8/2023 | Chesnutis | G09F 1/10 206/454 |
| 11,787,603 B2 * | 10/2023 | Batzel | B65D 43/20 220/345.3 |
| 11,872,474 B1 | 1/2024 | Anderson | |
| 2002/0101036 A1 | 8/2002 | Kutzik | |
| 2002/0129527 A1 | 9/2002 | Vaudreuil | |
| 2003/0070949 A1 * | 4/2003 | Harris | B65D 25/10 206/349 |
| 2003/0230514 A1 | 12/2003 | Baker | |
| 2005/0145535 A1 * | 7/2005 | Augborne | B65D 25/10 206/769 |
| 2005/0167430 A1 * | 8/2005 | Varadarajan | B65D 51/18 220/780 |
| 2006/0255053 A1 * | 11/2006 | Li | B65D 43/0212 220/780 |
| 2008/0169262 A1 * | 7/2008 | Ekkert | B65D 41/0414 215/250 |
| 2009/0166228 A1 * | 7/2009 | Kinunen | G09F 19/00 206/1.5 |
| 2010/0089934 A1 * | 4/2010 | Lim | G01N 21/85 220/806 |
| 2010/0140282 A1 * | 6/2010 | Steg | B65D 43/0212 220/780 |
| 2010/0176141 A1 * | 7/2010 | Evans | B65D 47/0842 220/780 |
| 2012/0067746 A1 * | 3/2012 | Gremaud | G07D 9/002 206/0.81 |
| 2012/0199599 A1 * | 8/2012 | Minnette | B65D 43/0212 220/780 |
| 2014/0138384 A1 * | 5/2014 | O'Brien | A45C 11/22 220/378 |
| 2015/0076143 A1 * | 3/2015 | Ryan | B65D 1/46 493/162 |
| 2023/0172373 A1 * | 6/2023 | Wiginton | A47G 1/06 206/775 |
| 2024/0149142 A1 | 5/2024 | Anderson | |

OTHER PUBLICATIONS

4 Reasons Not to Use Tape on Top Loaders; Beckett; available at https://www.beckett.com/news/4-reasons-not-to-use-tape-on-top-loaders/; last visited Aug. 10, 2022; 18 pp.

Tutorial on How to Seal Your Toploaders, Mar. 1, 2008; available at https://www.mtgsalvation.com/forums/magic-fundamentals/magic-general/317755-tutorial-on-how-to-seal-your-toploaders; last visited Aug. 10, 2022; 7 pp.

Reve's Magic Card Art; Sealing Inner Sleeves, Jul. 27, 2016; available at http://revesmtgart.blogspot.com/2016/07/sealing-inner-sleeves.html; last visited Aug. 10, 2022; 3 pp.

* cited by examiner

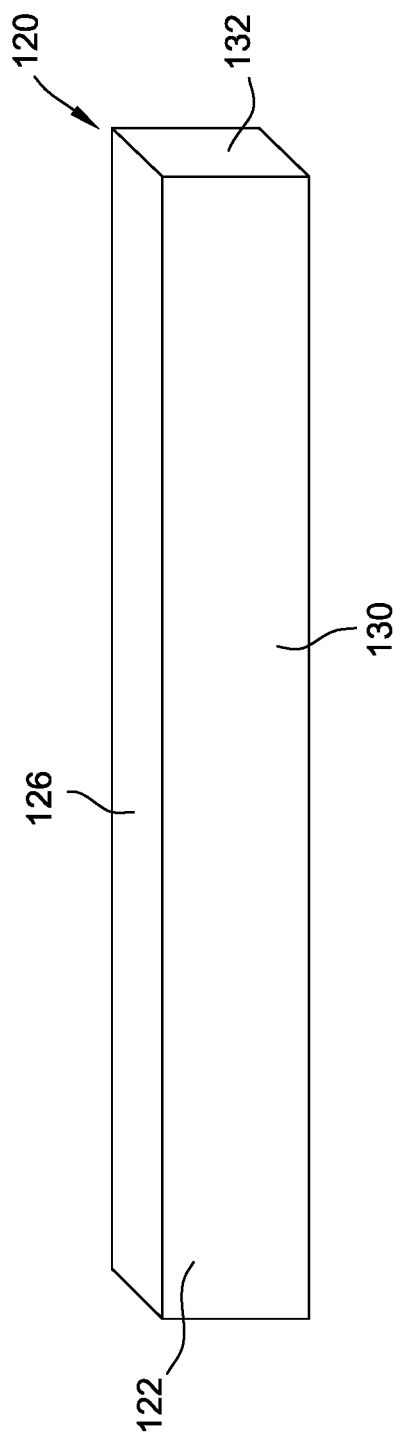
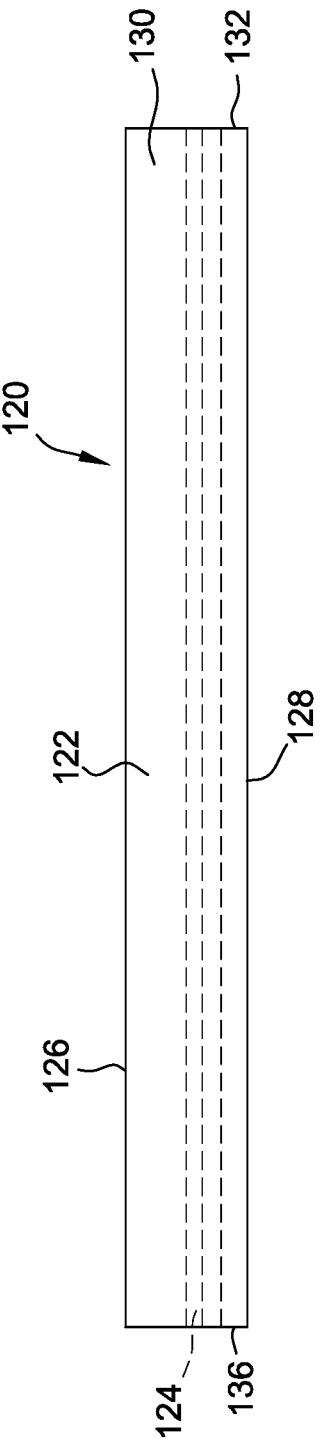
FIG. 8
FIG. 9

END CAPS FOR COLLECTIBLE CARD PROTECTIVE HOLDERS

CROSS-REFERENCE TO RELATED APPLICATIONS

This application claims priority to U.S. Provisional Application No. 63/226,975, filed Jul. 29, 2021, the contents of which are incorporated herein by reference in their entirety.

BACKGROUND

The field of the disclosure relates generally to protective systems for collectible cards and, more particularly, to end caps for collectible card protective holders.

Collectible cards include, for example, sports cards, playing cards, and character cards. Collectible cards may have monetary or sentimental value and may be collected as a hobby, for use in games or competitions, and/or as an investment. Collectible cards typically have the greatest value if they are in pristine, undamaged condition (i.e., mint). However, collectible cards are often constructed of materials such as paperboard that can be easily damaged. Accordingly, collectors store the cards within protective holders. The protective holders can be constructed of a rigid, durable material such as plastic.

One type of protective holder for collectible cards is a top-loader holder. The top-loader holder has at least two sides defining a pocket to receive one or more collectible cards. The top of the top-loader holder is open to allow cards to be placed in or removed from the pocket. The top-loader holders are popular because they are inexpensive and protect the cards in an easily accessible manner. However, the open end of the top-loaders may allow card(s) within the pocket to fall out of the pocket and be damaged. For example, the cards may fall out of the top-loaders when the cards are handled for showcasing, rearrangement, and/or for playing in a game or competition.

Also, collectible cards are often bought, sold, and/or traded based on their actual or potential value. To complete a transaction, the collectible cards may be placed in top-loader holders or other protective holders and packaged for shipping. However, the collectible cards may fall out of the holders during shipping. At least one party to the transaction may lose money, reputation, or a valuable asset if a collectible card falls out of the top-loader holders and is damaged during shipping. Accordingly, some people attempt to secure the collectible cards within the top-loader holders using tape, heat sealing, or other methods. However, tape, heat sealing, or other conventional methods for securing collectible cards within the top-loaders may not be aesthetically appealing, may not be effective in securing the collectible cards within the top-loader holders, and may damage the collectible cards.

Collectors may have hundreds or thousands of collectible cards. The collectors may store the collectible cards within large containers that are sized to hold card collections. To protect the cards within the containers, collectors may position the cards within top-loader holders or other protective cases and arrange the collectible cards within the containers for storage. Typically, the collectible cards are positioned tightly within the containers such that the front and back of adjacent cards are pressed against each other. Accordingly, only the edges of the collectible cards are visible when the collectible cards are positioned in the container and a collector may not be able to identify collectible cards within the container. The collector may have to remove cards from the container to identify the cards, which generates a risk of the collectible cards falling out of the protective cover or otherwise being damaged.

Therefore, there is a need for improved devices for protecting and storing collectible cards.

BRIEF DESCRIPTION

In one aspect, an end cap for a collectible card holder is provided. The collectible card holder includes a first side and a second side collectively defining a pocket therebetween for receiving a collectible card. The collectible card holder has an open end for inserting the collectible card into the pocket. The end cap generally comprises a cover sized to extend over and close the open end of the collectible card holder, and an engagement member configured to engage the collectible card holder and releasably secure the cover to the collectible card holder. The end cap prevents removal of the collectible card from the pocket when the cover is secured to the collectible card holder by the engagement member.

In another aspect, a collectible card protective assembly generally comprises a collectible card holder and a cover releasably attached to the collectible card holder. The collectible card holder includes a first side and a second side collectively defining a pocket therebetween for receiving a collectible card. The collectible card holder has an open end for inserting the collectible card into the pocket. The cover is sized to extend over and close the open end of the collectible card holder.

In yet another aspect, a storage system for collectible cards includes a container sized to hold a plurality of collectible cards and a plurality of collectible card holders. Each collectible card holder defines a pocket for receiving at least one of the collectible cards and has an open end for inserting the collectible card into the pocket. The storage system includes a plurality of end caps. Each end cap of the plurality of end caps is configured to releasably attach to an associated collectible card holder of the plurality of collectible card holders and close the open end of the associated collectible card holder.

BRIEF DESCRIPTION OF THE DRAWINGS

FIG. 8 is a perspective view of the end cap of the collectible card protective assembly of FIG. 5.

FIG. 9 is a front view of the end cap of FIG. 8.

DETAILED DESCRIPTION

Figure 1:
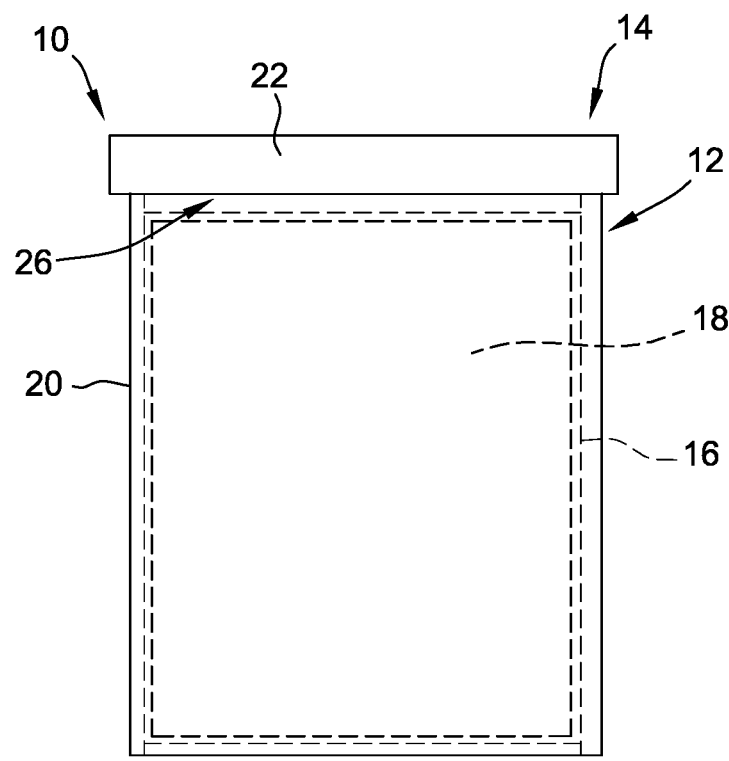
FIG. 1 is a front view of an exemplary embodiment of a collectible card protective assembly, the collectible card protective assembly including a card holder and an end cap.

FIG. 1 is a front view of an exemplary embodiment of a collectible card protective assembly 10. The collectible card protective assembly 10 includes a collectible card holder 12 and an end cap 14. The collectible card protective assembly 10 defines a pocket 16 and is sized to receive at least one collectible card 18 positioned within the pocket 16 of the collectible card protective assembly 10. The collectible card holder 12 includes at least one side 20 defining the pocket 16 for receiving the at least one collectible card 18.

As shown in FIG. 1, the end cap 14 includes a cover 22 releasably attached to the collectible card holder 12 and an engagement member 24 configured to engage the collectible card holder 12 and secure the cover 22 to the collectible card holder 12. The cover 22 is sized to extend over and close an open end 26 of the collectible card holder 12. For example, the cover 22 has a thickness that is equal to or slightly larger than the thickness of the collectible card holder 12.

The cover 22 of the end cap 14 prevents removal of the collectible card 18 from the pocket 16 of the collectible card holder 12 if the cover 22 is secured to the collectible card holder 12 by the engagement member 24. As a result, the end cap 14 reduces the risk of the collectible card 18 within the collectible card protective assembly 100 being damaged when the collectible card protective assembly 100 is handled, shipped, and/or stored. The end cap 14 is easy to attach to and remove from the collectible card holder 12 to provide access to the collectible cards 18 within the pocket 16. Also, the end cap 14 provides a secure attachment to and is compatible with different card holders and can be retrofitted to existing card holders. Moreover, the end cap 14 does not damage the collectible card holder 12 or the collectible cards 18 within the pocket 16 of the collectible card holder 12 when the end cap 14 is secured to the collectible card holder 12. For example, in this illustrated embodiment, the end cap 14 is free of any adhesive material and attaches to the collectible card holder 12 without the use of adhesives that could damage the collectible card holder 12 and/or the collectible cards 18.

Figure 2:
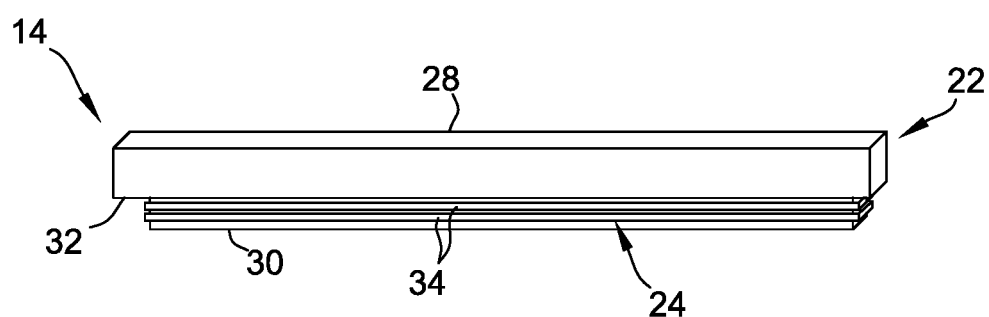
FIG. 2 is a perspective view of the end cap of the collectible card protective assembly of FIG. 1.
Figure 3:
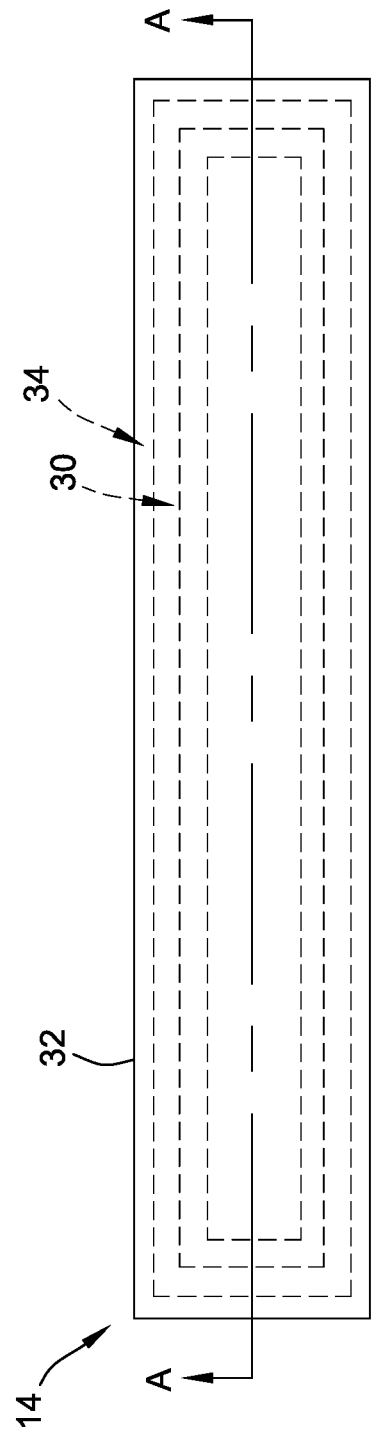
FIG. 3 is a top view of end cap of FIG. 2.
Figure 4:
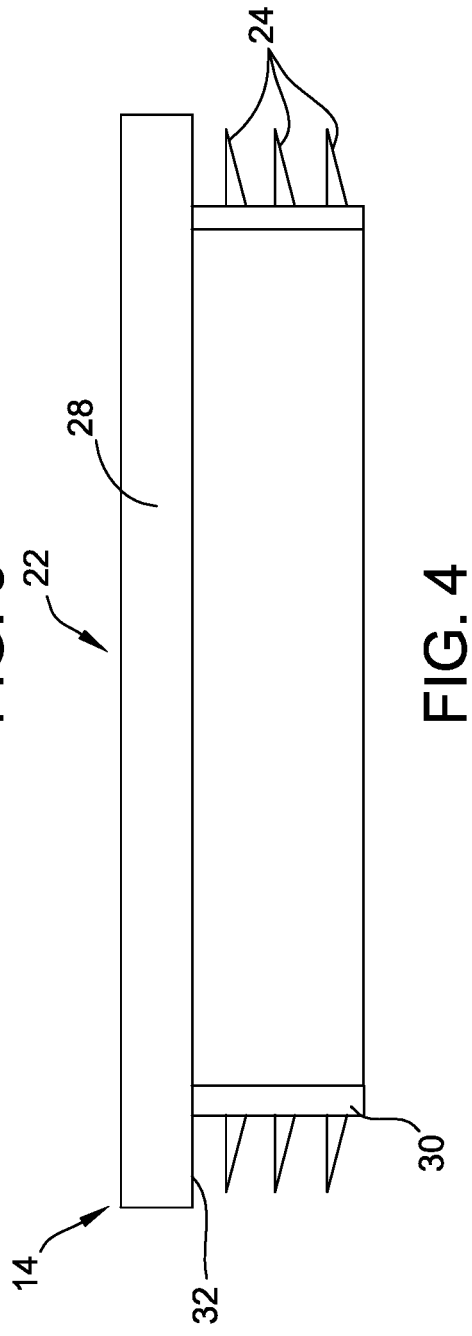
FIG. 4 is a sectional view of the end cap taken along section line A-A shown in FIG. 3.

FIG. 2 is a perspective view of the end cap 14 of the collectible card protective assembly 10 (shown in FIG. 1). FIG. 3 is a bottom view of the end cap 14. FIG. 4 is a sectional view of the end cap 14 taken along line A-A in FIG. 3. The end cap 14 includes the cover 22 and the engagement member 24. In other embodiments, the end cap 14 includes other components without departing from some aspects of the disclosure.

The cover 22 includes an end wall 28 and a plug 30 extending from the end wall 28. The end wall 28 is longer and wider than the plug 30 and forms an overhang 32 that is arranged to engage the top edge of the collectible card holder 12 (shown in FIG. 1). The plug 30 is sized and shaped to extend into the pocket 16. The engagement member 24 extends around the perimeter of the plug 30 and engages the side 20 (shown in FIG. 1) of the collectible card holder 12 to provide a friction or interference fit of the cover 22 on the collectible card holder 12 (shown in FIG. 1).

The end cap 14 may be any suitable material. For example, the cover 22 may include plastic materials such as polyvinyl chloride (PVC), polypropylene, silicone, epoxy, acrylic, or resin. In the illustrated embodiment, the cover 122 is constructed of transparent PVC material and is free of plasticizers or stearates which could damage some collectible cards. In some embodiments, the end wall 28 of the cover 22 includes an indicator such as a color or a character to facilitate a person identifying the cards within the collectible card protective assembly 10 (shown in FIG. 1).

The end cap 14 is constructed as a single piece using an additive manufacturing process. For example, the end cap 14 is fabricated by an additive manufacturing system that repeatedly deposits layers of PVC precursor material and consolidates the material to form the end cap 14. In other embodiments, the end cap 14 is fabricated using a cast and mold process in which a flowable material is injected into a mold and then cured to form the end cap 14. In further embodiments, the end cap 14 may be constructed in any suitable manner without departing from some aspects of the disclosure. For example, in some embodiments, the end cap 14 is constructed of two or more pieces that may include different materials and are attached together.

The engagement member 24 comprises a plurality of elastic bands 34 extending around an exterior surface of the plug 30. The elastic bands 34 are flexible and engage the collectible card holder 12 to provide a liquid-tight seal. In the illustrated embodiment, the elastic bands 34 have a triangular cross-section. Also, in the illustrated embodiment, the end cap 14 includes three of the elastic bands 34. The elastic bands 34 are integrally formed with the plug 30 and the end wall 28 such that the end cap 14 is a single piece. In other embodiments, the elastic bands 34 may be separate from the plug 30 without departing from some aspects of the disclosure.

The plug 30 extends from the end wall 28 a distance that is sufficient to secure the end cap 14 to the collectible card holder 12 without the plug 30 contacting the collectible card 18 within the collectible card protective assembly (shown in FIG. 1). For example, in some embodiments, the plug 30 extends from the end wall 28 a distance in a range of 1 mm to 30 mm.

Figure 5:
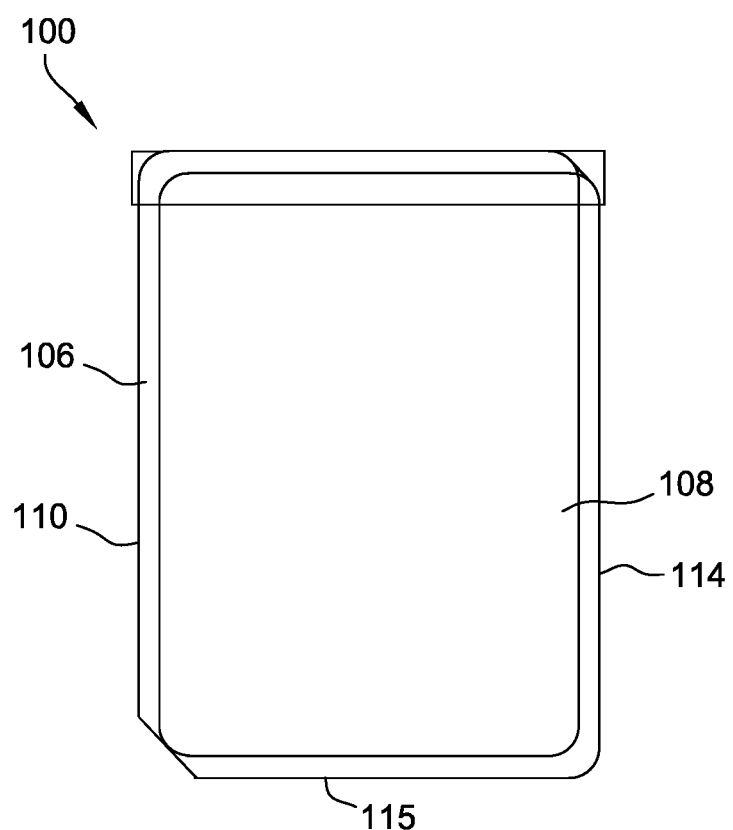
FIG. 5 is a front view of another exemplary embodiment of a collectible card protective assembly, the collectible card protective assembly including a card holder and an end cap.
Figure 6:
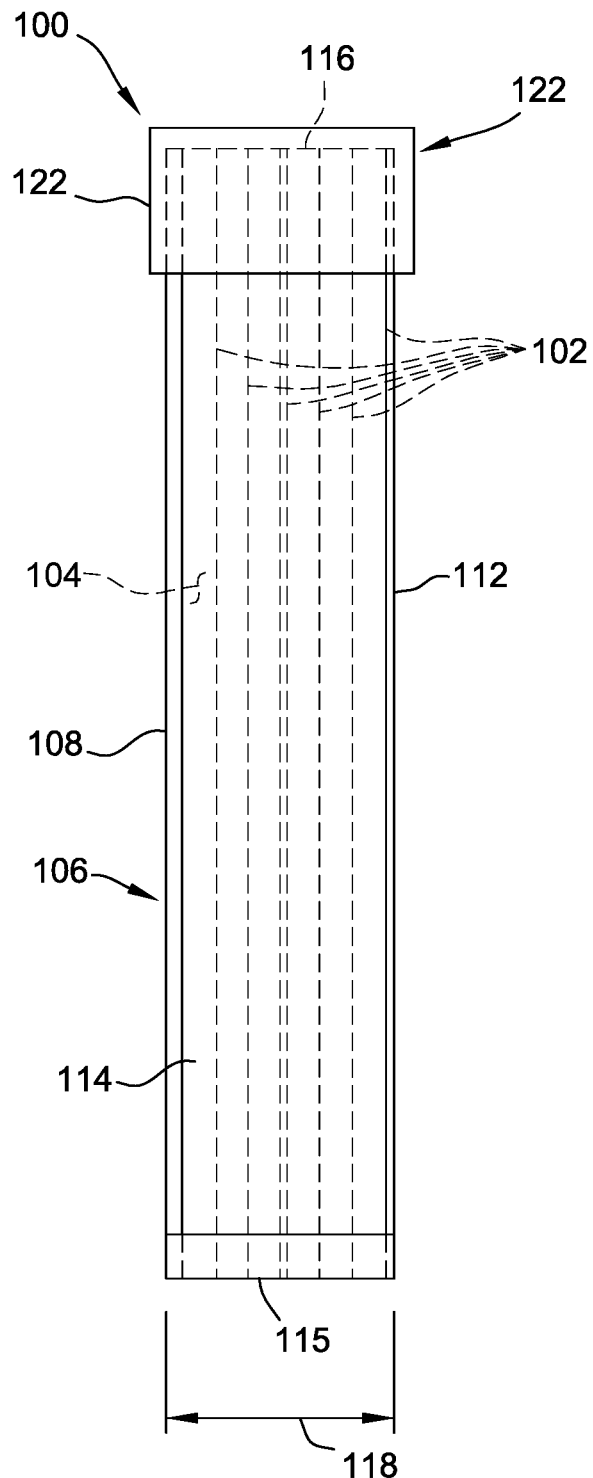
FIG. 6 is a side view of the collectible card protective assembly of FIG. 5, illustrating a plurality of collectible cards positioned within a pocket of the collectible card protective assembly.

FIG. 5 is a front view of an exemplary embodiment of a collectible card protective assembly 100. FIG. 6 is a side view of the collectible card protective assembly of FIG. 5, illustrating a plurality of collectible cards 102 positioned within a pocket 104 of the collectible card protective assembly 100. The collectible card protective assembly 100 includes a collectible card holder 106 and an end cap 120.

Figure 7:
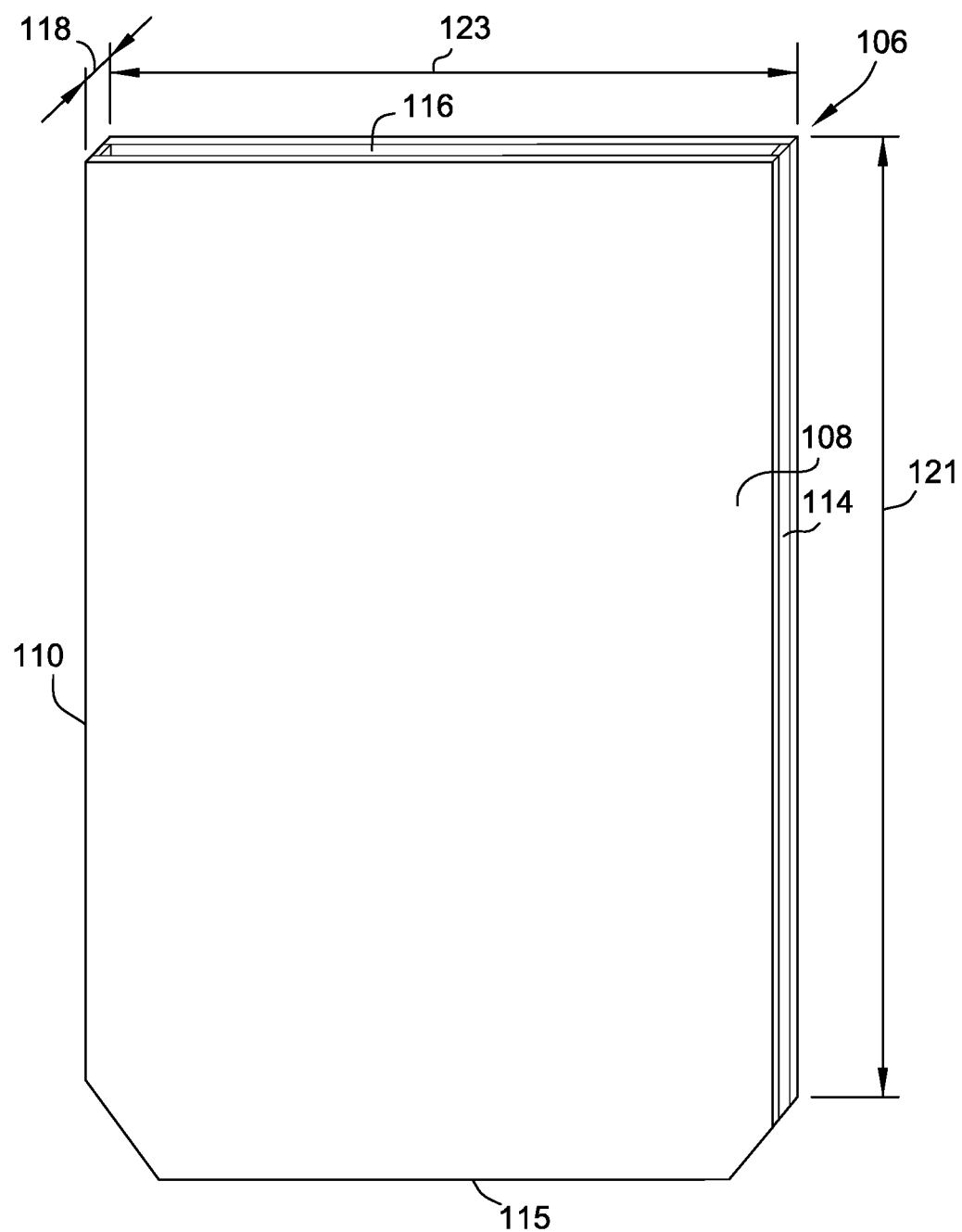
FIG. 7 is a perspective view of the card holder of the collectible card protective assembly of FIG. 5.

FIG. 7 is a perspective view of the collectible card holder 106. The collectible card holder 106 includes a first side 108, a second side 110, a third side 112, a fourth side 114, and an end wall 115 collectively defining a pocket 104 for receiving at least one collectible card 102. For example, the first side 108, the second side 110, the third side 112, and the fourth side 114 are joined to and extend from the end wall 115 which forms a closed end of the collectible card holder 106. The first side 108, the second side 110, the third side 112, and the fourth side 114 form an open end 116 of the collectible card holder 106 opposite the end wall 115.

In addition, the third side 112 is opposite the first side 108. The second side 110 and the fourth side 114 extend between and are joined to the first side 108 and the third side 112. In the illustrated embodiment, the collectible card holder 106 is a rectangular cuboid. In other embodiments, the collectible card holder 106 may be any suitable shape without departing from some aspects of the disclosure.

The collectible card holder 106 has a thickness 118 from the first side 108 to the third side 112. The thickness 118 is selected to contain one or more collectible cards with standard or nonstandard card thicknesses. Example thickness for collectible cards are in a range of 55 points (pt.) (0.5 millimeter (mm)) to 360 pt. (9.1 mm). For card sizing, 1 point is equal to 0.001 in. or 0.0254 mm.

In some embodiments, the collectible card holder 106 is sized to receive a single card within the pocket 104. In further embodiments, the collectible card holder 106 is sized to receive a plurality of collectible cards 102 within the pocket 104. In some embodiments, the thickness 118 of the collectible card holder 106 is substantially equal to the thickness of the card(s) received in the pocket 104. In the illustrated embodiment, the thickness 118 of the collectible card holder 106 is in a range of 1 mm to 9 mm. In some embodiments, the thickness 118 of the collectible card holder 106 is at least 1 mm. The collectible card holder 106 has a length 121 and a width 123. The length 121 and the width 123 are selected to accommodate one or more collectible cards. For example, in this illustrated embodiment, the length 121 of the collectible card holder 106 is 4 inches (101 mm) and the width 123 of the collectible card holder 106 is 3 inches (76 mm). In other embodiments, the collectible card holder 106 is other sizes without departing from some aspects of the disclosure.

As shown in FIGS. 5 and 6, the end cap 120 includes a cover 122 releasably attached to the collectible card holder 106 and an engagement member 124 configured to engage the collectible card holder 106 and secure the cover 122 to the collectible card holder 106. The cover 122 is sized to extend over and close the open end 116 of the collectible card holder 106. For example, the cover 122 has a thickness 125 that is equal to or slightly larger than the thickness 118 of the collectible card holder 106. For example, in some embodiments, the thickness 125 is in a range of 1 mm to 9 mm or in a range of 2 mm to 9 mm.

The cover 122 of the end cap 120 prevents removal of the collectible card 102 from the pocket 104 of the collectible card holder 106 if the cover 122 is secured to the collectible card holder 106 by the engagement member 124. As a result, the end cap 120 reduces the risk of the collectible card 102 being damaged when the collectible card 102 within the collectible card protective assembly 100 is handled, shipped, and/or stored. The end cap 120 is easy to attach to and remove from the collectible card holder 106 to provide access to the collectible cards 102 within the pocket 104. Also, the end cap 120 provides a secure attachment to and is compatible with different card holders and can be retrofitted to existing card holders. Moreover, the end cap 120 does not damage the collectible card holder 106 or the collectible cards 102 within the pocket 104 of the collectible card holder 106 when the end cap 120 is secured to the collectible card holder 106. For example, in this illustrated embodiment, the end cap 120 is free of any adhesive material and attaches to the collectible card holder 106 without the use of adhesives that could damage the collectible card holder 106 and/or the collectible cards 102.

Figure 10:
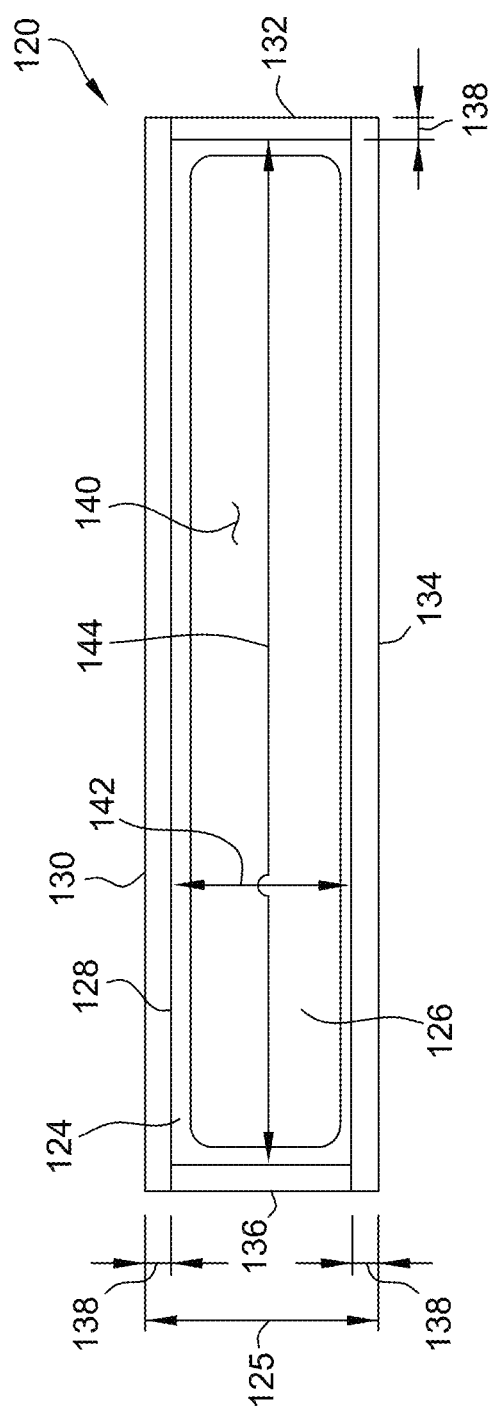
FIG. 10 is a bottom view of end cap of FIG. 8.

FIG. 8 is a perspective view of the end cap 120 of the collectible card protective assembly 100 (shown in FIG. 5). FIG. 9 is a front view of the end cap 120. FIG. 10 is a bottom view of the end cap 120. The end cap 120 includes the cover 122 and the engagement member 124. In other embodiments, the end cap 120 includes other components without departing from some aspects of the disclosure. In some embodiments, the engagement member 124 is omitted.

The cover 122 includes an end wall 126, an open end 128, a first side 130, a second side 132, a third side 134, and a fourth side 136. The first side 130, the second side 132, the third side 134, and the fourth side 136 are joined together by the end wall 126 to form a closed end of the cover 122. The first side 130, the second side 132, the third side 134, and the fourth side 136 extend from edges of the end wall 126 around the circumference of the end wall 126. In the example, the first side 130, the second side 132, the third side 134, and the fourth side 136 are perpendicular to the end wall 126. The first side 130, the second side 132, the third side 134, and the fourth side 136 define the open end 128 opposite the end wall 126. In other embodiments, the cover 122 may include other sides or walls without departing from some aspects of the disclosure. For example, in some embodiments, the cover 122 includes at least one wall that is curved. In particular, in some embodiments, the cover 122 may include a wall that is generally U-shaped and defines the closed end of the cover 122.

The first side 130, the second side 132, the third side 134, the fourth side 136, and the end wall 126 define a cavity 140 sized to receive a portion of the collectible card holder 106 (shown in FIG. 7). For example, the cavity 140 has a width 142 defined between inner surfaces of the first side 130 and the third side 134 that is equal to or greater than the width of the collectible card holder 106. In addition, the cavity 140 has a length 144 that is equal to or greater than the length of the collectible card holder 106. In the illustrated embodiment, the length 144 of the cavity 140 is greater than the width 142 of the cavity 140 and the cover 122 has a rectangular cuboid shape. In other embodiments, the cover 122 may have other shapes and sizes without departing from some aspects of the disclosure. For example, in some embodiments, at least a portion of the cover 122 is sized and shaped to extend into the pocket 104 of the collectible card holder 106.

The first side 130, the second side 132, the third side 134, the fourth side 136, and the end wall 126 may be joined together in any suitable manner. In the example, the cover 122 is constructed as a single piece. The cover 122 can be constructed using an additive manufacturing process, a molding process, or in any other suitable manner. In some embodiments, the cover 122 is constructed from a silicone or other flexible material that is folded or creased to form the first side 130, the second side 132, the third side 134, the fourth side 136, and the end wall 126. In other embodiments, the first side 130, the second side 132, the third side 134, and/or the fourth side 136 may be attached to the end wall 126 by welding, adhesive, mechanical fasteners, and/or any suitable attachment means.

The cover 122 may be any suitable material. For example, the cover 122 may include plastic materials such as polyvinyl chloride (PVC), polypropylene, silicone, epoxy, acrylic, or resin. In the illustrated embodiment, the cover 122 is constructed of transparent PVC material. In some embodiments, the cover 122 includes an indicator such as a color or a character to facilitate a person identifying the cards within the collectible card protective assembly 100 (shown in FIG. 5).

Each of the first side 130, the second side 132, the third side 134, the fourth side 136, and the end wall 126 has a thickness 138. For example, in the illustrated embodiment, the thickness 138 of each of the first side 130, the second side 132, the third side 134, the fourth side 136, and the end wall 126 is less than 1 mm. The thickness 138 is selected such that the cover 122 is durable and to facilitate the cover 122 protecting the cards. In addition, the cover 122 is inexpensive to manufacture because of the construction materials of the cover 122 and the selected thickness.

The first side 130, the second side 132, the third side 134, and the fourth side 136 of the cover 122 are configured to engage the first side 108, the second side 110, the third side 112, and the fourth side 114 of the collectible card holder 106 (shown in FIGS. 1 and 2). The end wall 126 extends across and covers the open end 116 of the collectible card holder 106 when the cover 122 is positioned on the card holder 106. In some embodiments, the first side 130, the second side 132, the third side 134, the fourth side 136, and/or the end wall 126 is flexible to facilitate the cover 122 fitting onto the collectible card holder 106 (shown in FIGS. 1 and 2).

The engagement member 124 is disposed an interior surface of the first side 130, the second side 132, the third side 134, and the fourth side 136 and extends between the interior surface of the cover 122 and the outer surface of the first side 108, the second side 110, the third side 112, and the fourth side 114 of the collectible card holder 106 (shown in FIGS. 1 and 2) when the cover 122 is positioned onto the collectible card holder 106. The engagement member 124 frictionally engages the outer surfaces of the collectible card holder 106 and secures the cover 122 to the collectible card holder 106 when the cover 122 is positioned onto the collectible card holder 106.

In this illustrated embodiment, the engagement member 124 comprises an elastic member such as a gasket that extends continuously along an inner circumference of the cover 122 and frictionally engages the collectible card holder 106. For example, the engagement member 124 may be constructed or rubber, plastic, silicone, epoxy, resin, or any other suitable material. In addition, the engagement member 124 provides a watertight seal on the collectible card holder 106 to prevent moisture damage to the cards. In other embodiments, the end cap 120 includes other engagement members 124 without departing from some aspects of the disclosure. For example, in some embodiments, the engagement member 124 comprises discrete engagement components disposed at spaced apart locations within the cover 122. In further embodiments, the engagement member 124 is disposed on an exterior of the cover 122. In some embodiments, the engagement member 124 comprises a friction creating coating on the cover 122 and/or the collectible card holder 106.

Figure 11:
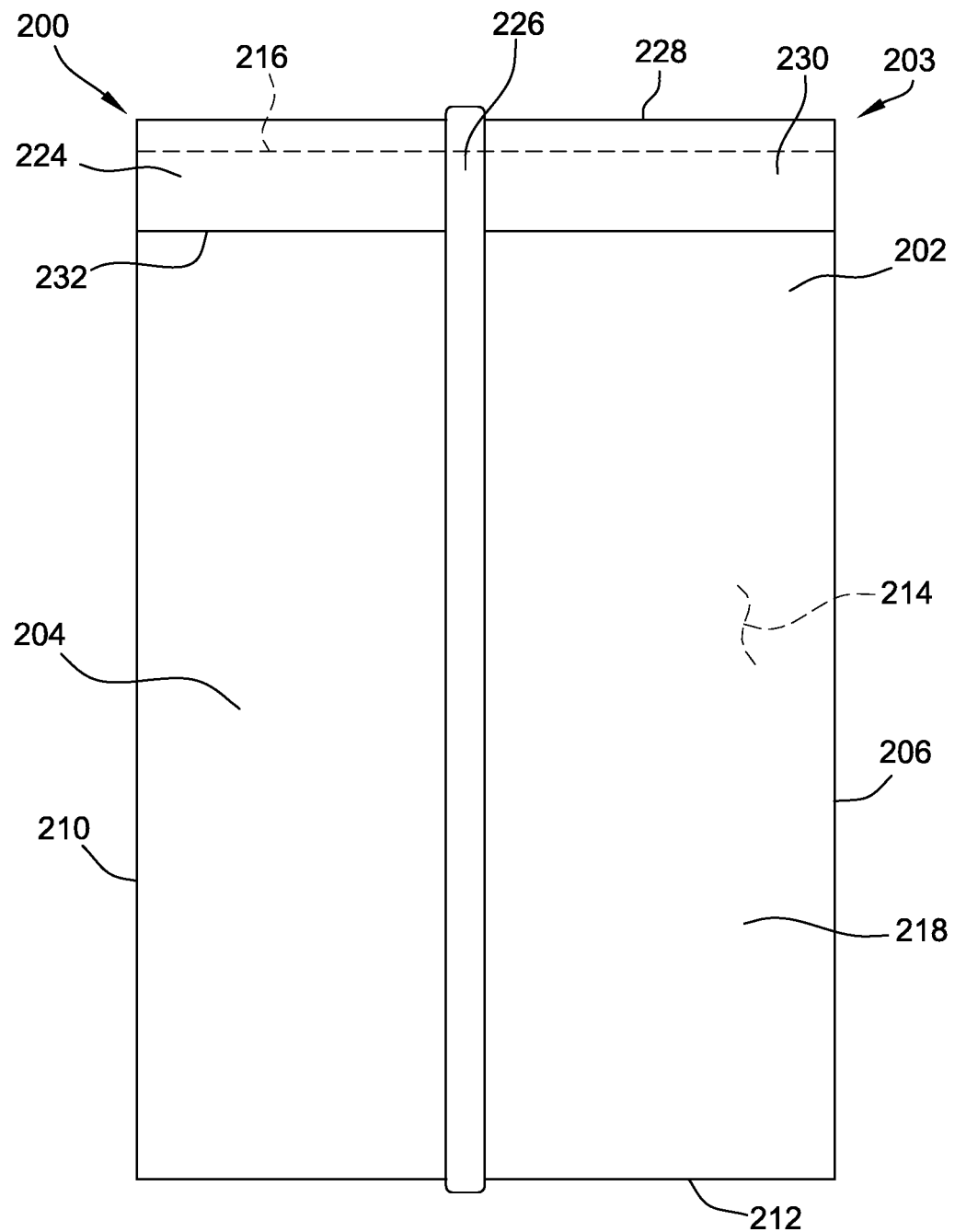
FIG. 11 is a front view of an exemplary embodiment of a collectible card protective assembly including a multipart card holder.
Figure 12:
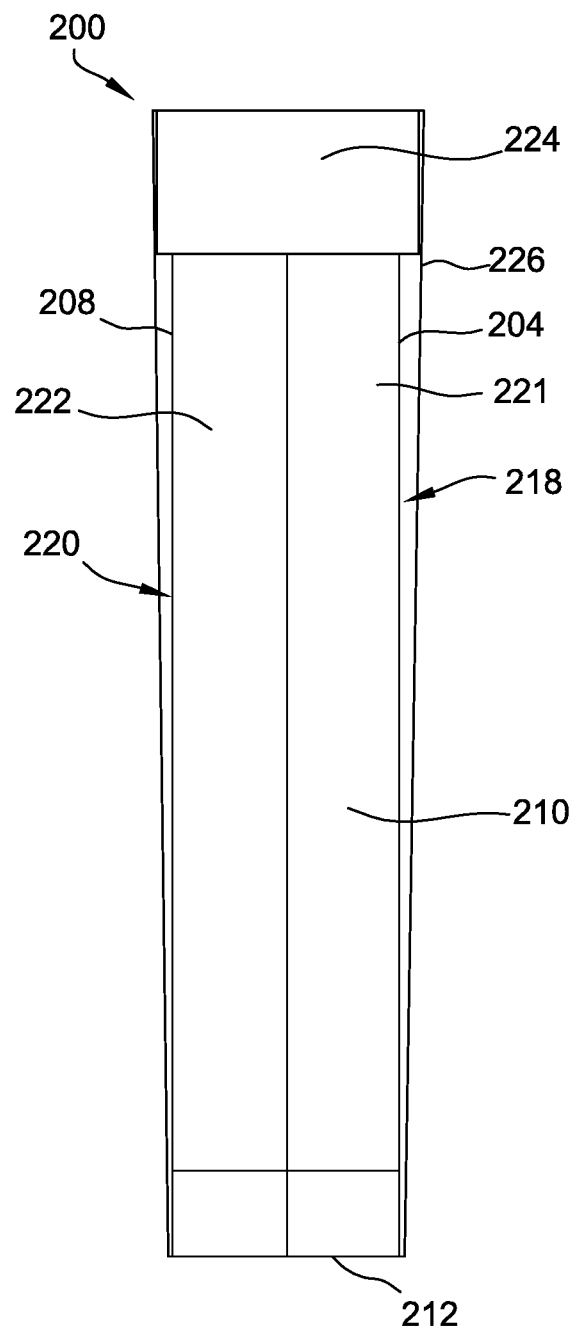
FIG. 12 is a side view of the collectible card protective assembly of FIG. 11.

FIG. 11 is a front view of an exemplary embodiment of a collectible card protective assembly 200 including a multi-part card holder 202. FIG. 12 is a side view of the collectible card protective assembly 200. The collectible card protective assembly 200 includes a collectible card holder 202 and an end cap 203. The collectible card holder 202 includes a first side 204, a second side 206, a third side 208, a fourth side 210, and an end wall 212 collectively defining a pocket 214 for receiving at least one collectible card 102 (shown in FIG. 6). The first side 204, the second side 206, the third side 208, and the fourth side 210 form an open end 216 of the collectible card holder 202 opposite the end wall 212.

The collectible card holder 202 includes a first part 218 and a second part 220 that are releasably attached together to form the pocket 214. The first part 218 includes the first side 204 and a first flange 221 extending along the edge of the first side 204. The second part 220 includes the second side 206 and a second flange 222 extending along the edge of the second side 206. The first part 218 and the second part 220 attach together such that the first flange 221 and the second flange 222 engage each other and form the second side 206, the fourth side 210, and the end wall 212. In other embodiments, the collectible card holder 202 may include less than or more than two parts without departing from some aspects of the disclosure.

The end cap 203 includes a cover 224 and an engagement member 226. The end cap 203 prevents removal of collectible cards from the pocket 214 if the cover 224 is secured to the collectible card holder 202 by the engagement member 226. The cover 224 includes an end wall 228 and at least one sidewall 230 that extends along an edge of the end wall 228. The sidewall 230 defines an open end 232 opposite the end wall 228. The sidewall 230 engages the first side 204, the second side 206, the third side 208, and the fourth side 210 when the cover 224 is positioned over the open end 216.

The engagement member 226 is configured to extend around the cover 224 and the collectible card holder 202 to secure the cover 224 onto the collectible card holder 202. In this illustrated embodiment, the engagement member 226 is a continuous elastic band and has a length that is equal to or less than the height of the collectible card holder 202 and the cover 224. For example, the engagement member 226 is constructed of polyester, rubber, wool, cotton, and/or any other elastic material. In some embodiments, the collectible card protective assembly 200 includes more than one engagement member 226.

To assemble the collectible card protective assembly 200, one or more cards are positioned between the first part 218 and the second part 220 and the first part 218 and the second part 220 are engaged with each other with the one or more cards therebetween. The engagement member 226 is stretched to fit over the collectible card holder 202 and the cover 224. The engagement member 226 compresses the collectible card holder 202 and the cover 224 together when the engagement member 226 is positioned around the collectible card holder 202 and the cover 224. In addition, the engagement member 226 retains the parts 218, 220 of the collectible card holder 202 together. To disassemble the collectible card protective assembly 200, the engagement member 226 is removed from the card holder 202 and the cover 224. The cover 224 is removed from the card holder 202 and the parts 218, 220 are separated to access the one or more cards within the pocket 214. In some embodiments, at least a portion of the cover 224 is integrated into the first part 218 and/or the second part 220.

Figure 13:
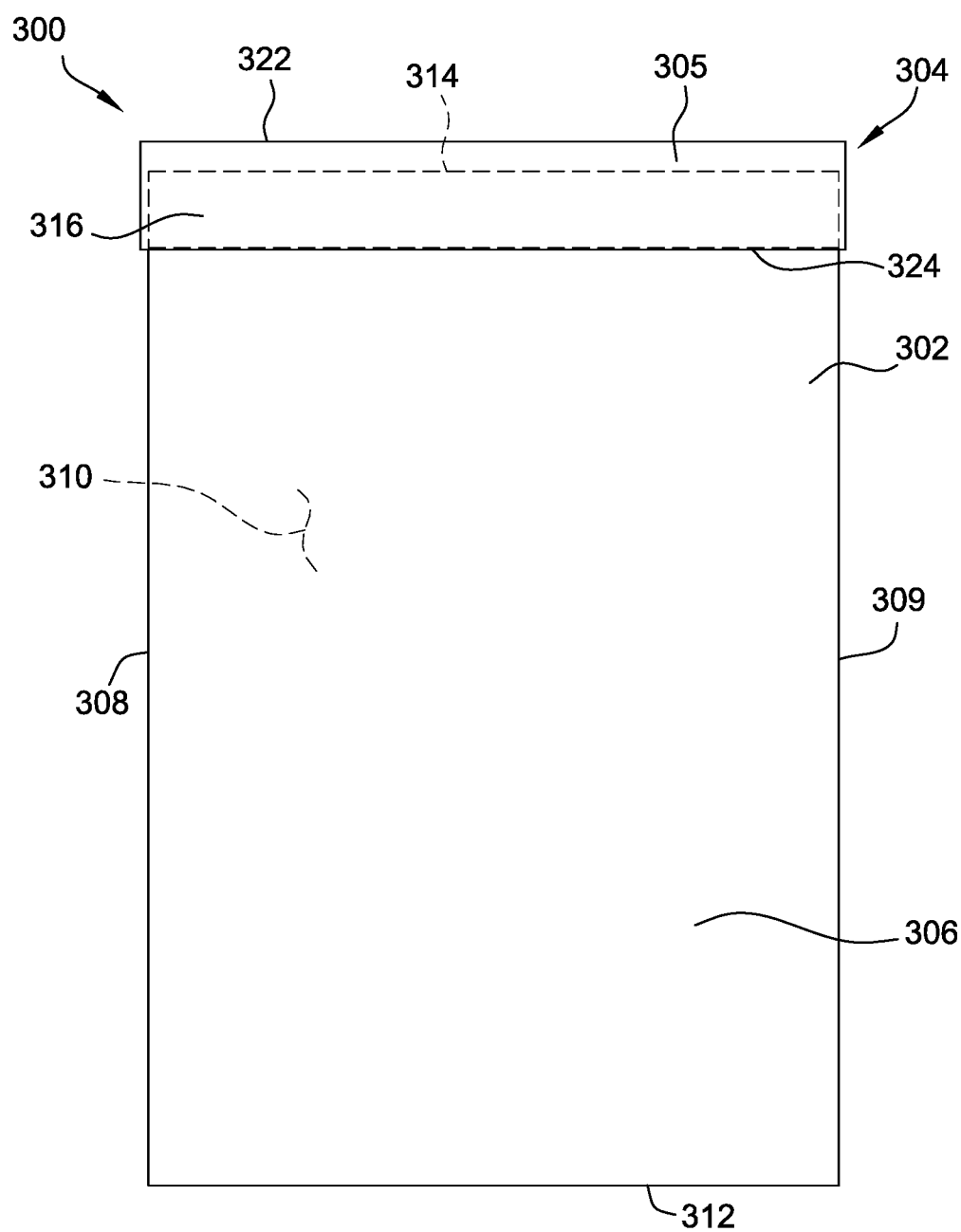
FIG. 13 is a front view of an exemplary embodiment of a collectible card protective assembly including a sleeve shaped card holder and end cap.
Figure 14:
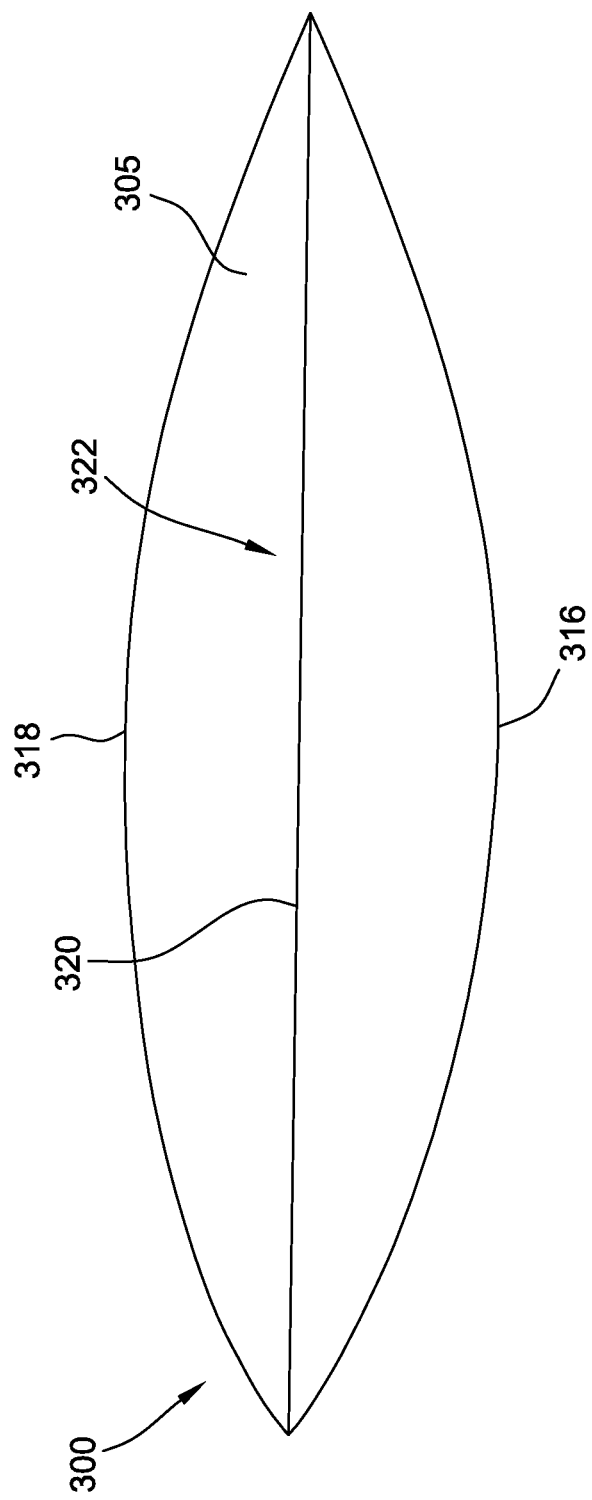
FIG. 14 is a top view of the collectible card protective assembly of FIG. 13.

FIG. 13 is a front view of an exemplary embodiment of a collectible card protective assembly 300 including a collectible card holder 302 and an end cap 304. FIG. 14 is a top view of the collectible card protective assembly 300. The collectible card holder 302 includes a first side 306 and a second side 308. The first side 306 is joined to the second side 308 along three edges 309 and the first side 306 and the second side 308 form a closed end 312 at one of the edges 309. The first side 306 and the second side 308 collectively define a pocket 310 and an open end 314 opposite the closed end 312. Accordingly, the collectible card holder 302 is a sleeve-shaped pouch. In the illustrated embodiment, the edges 309 are linear. In other embodiments, the edges 309 are at least partially curved.

The end cap 304 includes a cover 305 including a first side 316 and a second side 318. The first side 316 and the second side 318 are joined together along at least one edge 320 and form a closed end 322. In addition, the first side 316 and the second side 318 define an open end 324 opposite the closed end 322. The first side 316 and the second side 318 are configured to engage the first side 306 and the second side 308 of the collectible card holder 302 when the cover 305 is positioned on the collectible card holder 302.

The width of the cover 305 is equal to or slightly less than the width of the collectible card holder 302 such that the cover 305 provides an interference fit of the cover 305 onto the collectible card holder 302. In other embodiments, the end cap 304 includes an engagement member to secure the cover 305 onto the collectible card holder 302.

The collectible card holder 302 and the end cap 304 are simpler and less expensive to manufacture than other card holder assemblies because the collectible card holder 302 and the end cap 304 each include only two sides. In addition, the collectible card protective assembly 300 may be used with other protection systems.

Figure 15:
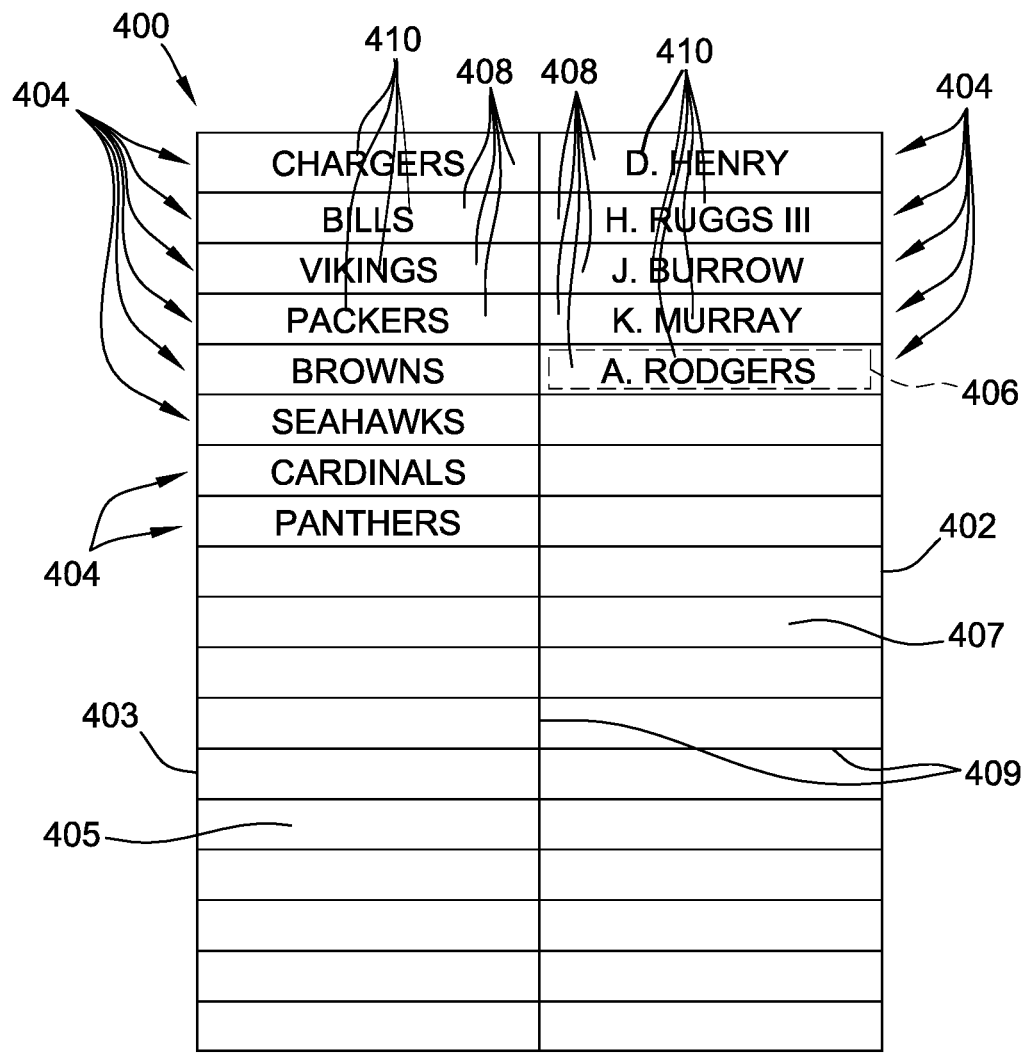
FIG. 15 is a top view of an exemplary embodiment of a storage system for collectible cards, the storage system including end caps with identifiers to facilitate a person identifying a collectible card within a pocket of an associated collectible card holder.

FIG. 15 is a top view of an exemplary embodiment of a storage system 400 for collectible cards. The storage system 400 includes a container 402 and collectible card protective assemblies 404. The container 402 includes at least one sidewall 403 and an endwall 405 collectively defining a cavity 407. In addition, the container 402 includes a plurality of dividers 409 that is optionally positioned within the cavity 407. In some embodiments, the container 402 includes a lid (not shown in FIG. 15). In other embodiments, the storage system 400 may include different containers 402 without departing from some aspects of the disclosure.

Each collectible card protective assembly 404 includes a collectible card holder 406 and an end cap 408. Each collectible card holder 406 defines a pocket for receiving at least one collectible card and has an open end for inserting the collectible card into the pocket. For example, the collectible card holders 406 may include features of any of the collectible card holders described herein (e.g., collectible card holders 106, 202, 302).

The end caps 408 are configured to releasably attach to an associated collectible card holder 406 and close the open end of the associated collectible card holder 406. The end caps 408 may include features of any of the end caps described herein (e.g., end caps 120, 203, 304).

The container 402 is sized to receive a plurality of the collectible card protective assemblies 404 within the cavity 407. The collectible card protective assemblies 404 are arranged to facilitate storage within the container 402. For example, the collectible card protective assemblies 404 are positioned within the container 402 in a face-to-face standup arrangement such that at least a portion of the end caps 408 are exposed.

In this illustrated embodiment, each end cap 408 has an identifier 410 that facilitates a person identifying a collectible card within the pocket of the associated collectible card holder 406. The identifier 410 may be formed or formed in the end cap 408 or formed separately and attached to the end cap 408. For example, in some embodiments, the identifier 410 includes a symbol, alphanumeric characters, a picture, a color, a shape, and any other suitable identifiers. For example, in this illustrated embodiment, the identifiers 410 include color and/or alphanumeric characters that are associated with the collectible cards within the respective collectible card holders 406. Specifically, in the illustrated embodiment, the identifiers 410 include team or player names that are associated with the collectible cards within the respective collectible card holders 406. In addition, in the illustrated embodiment, the identifiers 410 include colors that are associated with the collectible cards within the respective collectible card holders 406 (e.g., team colors).

Accordingly, the end caps 408 facilitate a person identifying the cards within each collectible card protective assembly 404 in the container 402 without the person removing the cards from the collectible card protective assemblies 404, or without even removing the collectible card protective assemblies 404 from the container 402. As a result, the cards are better protected within the collectible card protective assemblies 404 and within the container 402 than in systems that did not include end caps.

In some embodiments, a kit includes one or more end caps (e.g., end cap 120, end cap 203, end cap 304, and end cap 408). For example, the kit may include end caps of the same size, end caps of different sizes, or a single end cap. In an exemplary embodiment, the kit includes a first end cap having a first size and a second end cap having a second size. The second size is larger than the first size.

The end caps are associated with and sized to attach to and close collectible card holders (e.g., collectible card holder 406, collectible card holder 106, collectible card holder 202, collectible card holder 302). In some embodiments, the kit includes one or more collectible card holders that are associated with the one or more end caps of the kit.

Figure 16:
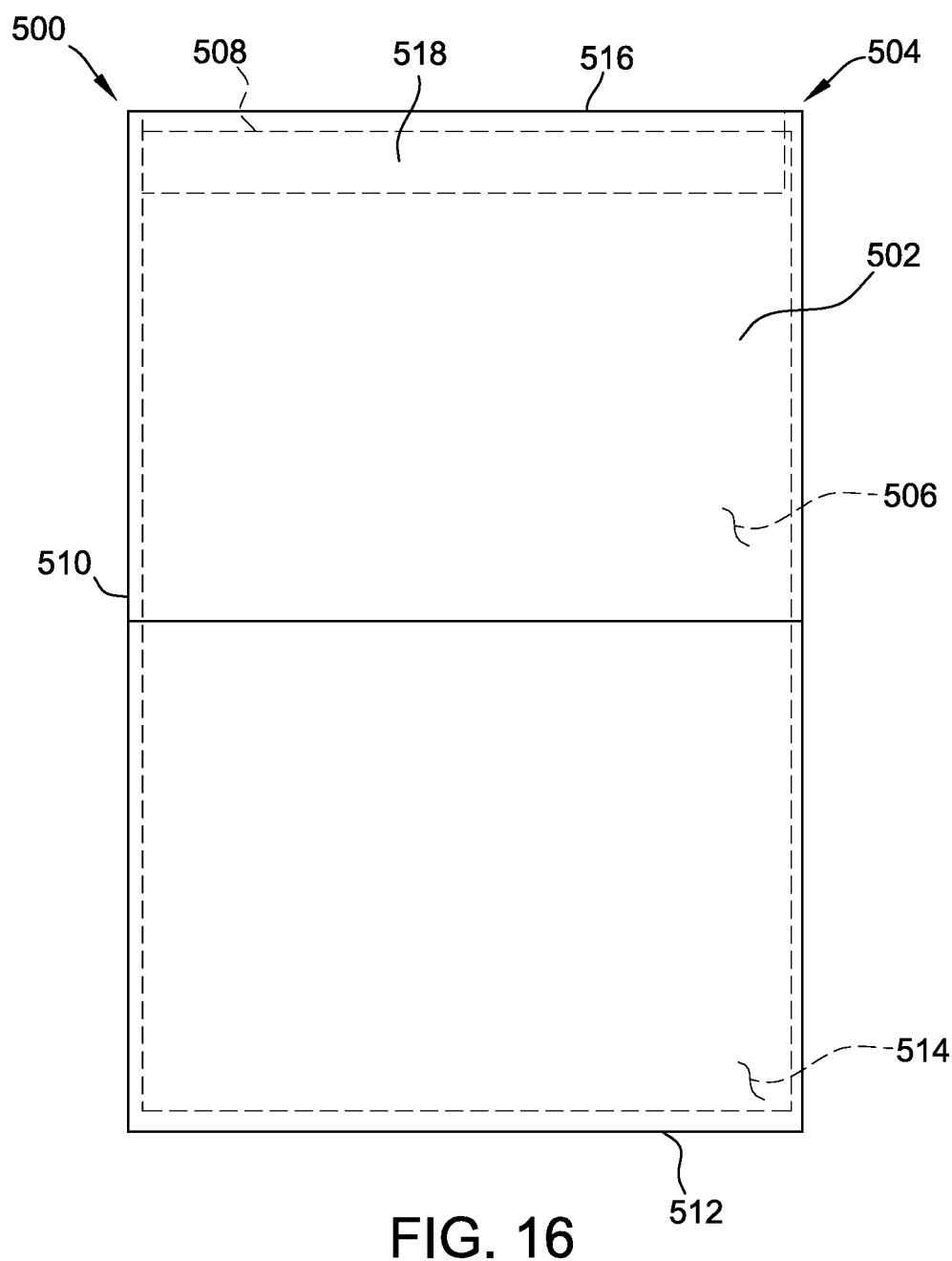
FIG. 16 is a front view of an exemplary embodiment of a collectible card protective assembly including an end cap assembly.
Figure 17:
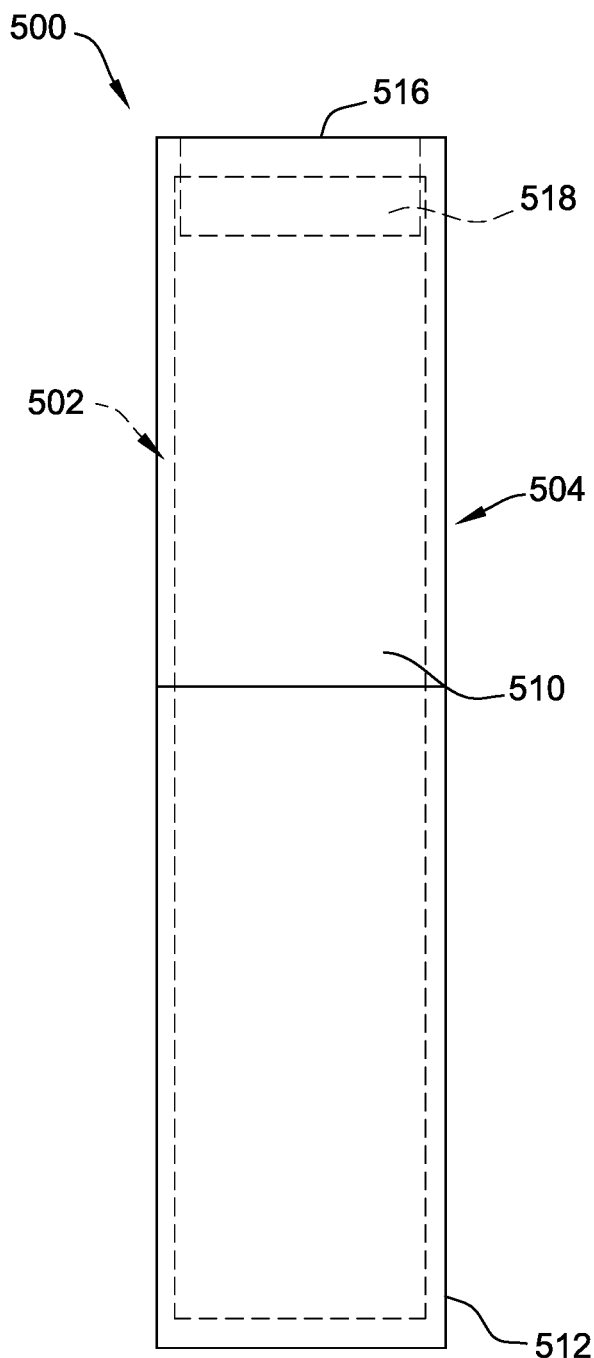
FIG. 17 is a side view of the collectible card protective assembly of FIG. 16.

FIG. 16 is a front view of an exemplary embodiment of a collectible card protective assembly 500 including an end cap assembly 504. FIG. 17 is a side view of the collectible card protective assembly 500. The collectible card protective assembly 500 includes a collectible card holder 502 and an end cap assembly 504. The collectible card holder 502 defines a pocket 506 for receiving at least one collectible card 102 (shown in FIG. 6) and has an open end 508.

The end cap assembly 504 includes a first part 510 and a second part 512 that are releasably attached together to form a pocket 514 sized to receive the collectible card holder 502. The first part 510 and the second part 512 completely enclose the collectible card holder 502 when the first part 510 and the second part 512 are attached together. The first part 510 may engage the second part 512 in any suitable manner. For example, in some embodiments, the first part 510 and/or the second part 512 include clips or friction fit engagement features. In other embodiments, the end cap assembly 504 may include less than or more than two parts without departing from some aspects of the disclosure.

The first part 510 includes a cover 516 and a plug 518. The cover 516 extends over the open end 508 and the plug 518 extends into the pocket 506. The second part 512 acts as an engagement member and engages the closed end of the collectible card holder 502 to secure the first part 510 to the collectible card holder 502. Accordingly, the end cap assembly 504 prevents removal of collectible cards from the pocket 506 if the end cap assembly 504 is secured to the collectible card holder 502.

Figure 18:
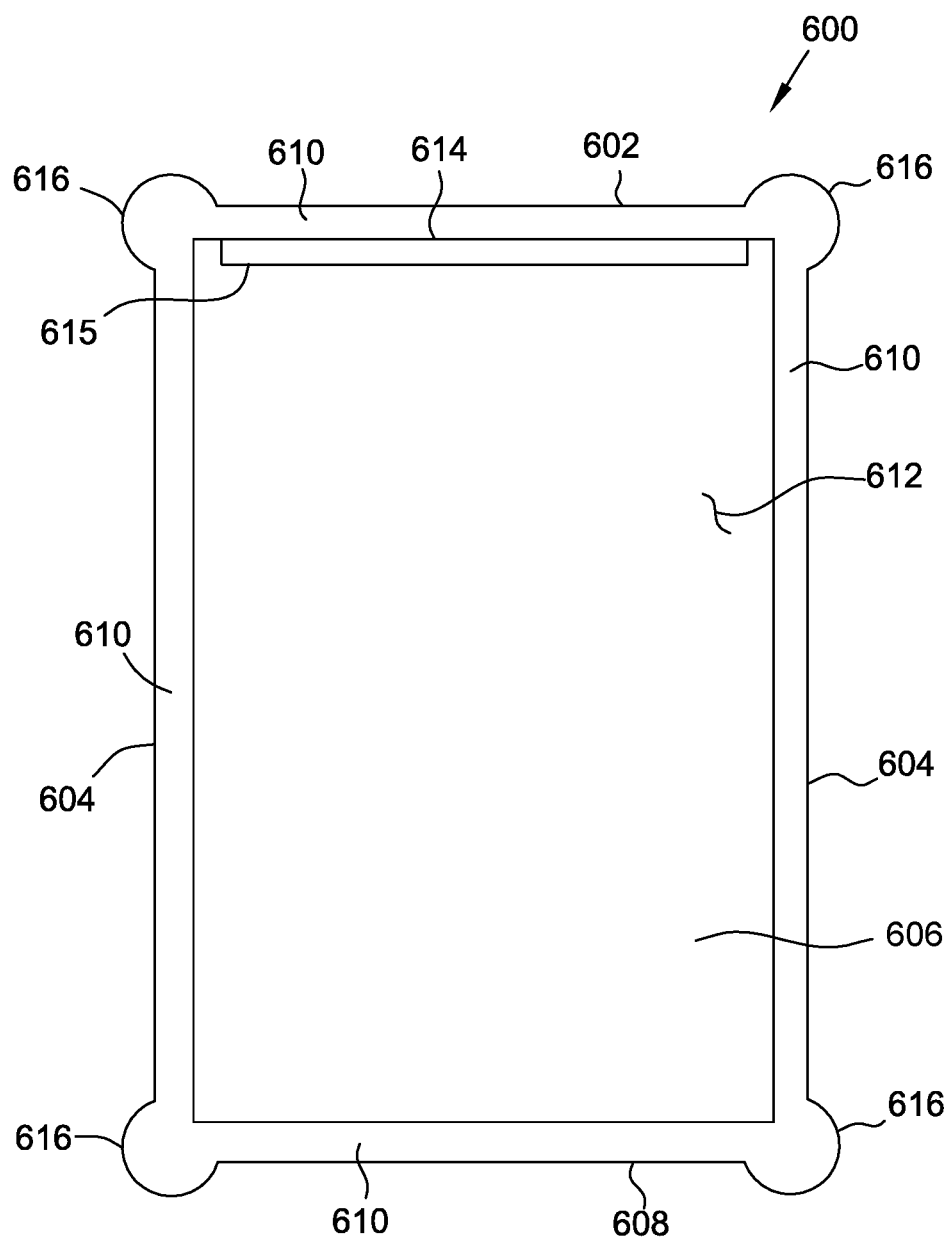
FIG. 18 is a front view of an exemplary end cap including protective corners.

FIG. 18 is a front view of an exemplary end cap 600. The end cap 600 includes a top 602, sides 604, a back 606, a bottom 608, and flanges 610. The top 602, sides 604, back 606, bottom 608, and flanges 610 collectively define a pocket 612 to receive a collectible card holder. The flanges 610 extend inward from the sides 604 and define an opening 614 for the collectible card holder and/or a collectible card to be positioned into the pocket 612. The flanges 610 act as an engagement member and engage the collectible card holder within the pocket 612. The top 602 includes a plug 615 that extends into the collectible card holder.

The end cap 600 is positioned onto a collectible card holder by stretching the sides 604 and the flanges 610 over the edges of the collectible card holder until the collectible card holder fits into the pocket 612. The end cap 600 is sized to retain the collectible card holder within the pocket. For example, the opening 614 has a width and a length that are less than the width and length of the collectible card holder, respectively, when the end cap 600 is in a relaxed, unstretched state.

For example, the end cap 600 is constructed of a flexible, elastic material. In the illustrated embodiment, the top 602, sides 604, back 606, bottom 608, and flanges 610 are integrally formed as a single piece.

The end cap 600 has protective corners 616 that protrude outward from the top 602, the sides 604, and the back 606 and protect the corners of cards within the collectible card holder and the end cap 600 if the collectible card holder is dropped or mishandled. For example, the protective corners 616 are semicircular protrusions. In other embodiments, the end cap 600 has corners that are right angles, slanted or beveled, curved, or any other suitable shape.

Embodiments of the collectible card protective assemblies are described herein and include collectible card holders and end caps that close the collectible card holders. The end caps prevent damage to cards within pockets of the collectible card holders because the When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. An end cap for a collectible card holder, the end cap comprising:
    a cover including a first side, a second side, a third side, a fourth side, and an end wall, wherein the cover has a thickness from the first side to the third side in a range of 1 millimeter (mm) to 9 mm, wherein the first side, the second side, the third side, and the fourth side each have an inner surface; and
    an engagement member extending on the inner surfaces of the first, second, third, and fourth sides, the engagement member configured to engage the collectible card holder and releasably secure the cover to the collectible card holder,
    wherein the first side, the second side, the third side, and the fourth side are perpendicular to the end wall, wherein a length defined between the inner surfaces of the second and fourth sides is greater than a width defined between the inner surfaces of the first and third sides, and wherein the cover has a rectangular cuboid shape, and
    wherein the first side, the second side, the third side, the fourth side, and the end wall are flexible.

2. An end cap in accordance with claim 1, wherein the engagement member comprises an elastic member extending along a circumference of the cover, the elastic member has a friction-creating surface for frictionally engaging the collectible card holder when the cover is positioned onto the collectible card holder, wherein the engagement member is constructed of rubber, plastic, silicone, epoxy, or resin.

3. An end cap in accordance with claim 2, wherein the elastic member is a gasket that extends continuously along the entire circumference of the cover and prohibits water intrusion between the elastic member and the cover.

4. An end cap in accordance with claim 1 further comprising at least one identifier on the cover, wherein the identifier includes a symbol, alphanumeric characters, a picture, a color, or a shape.

5. An end cap in accordance with claim 1, wherein the cover comprises an open end, wherein the first side, the second side, the third side, and the fourth side are joined together by the end wall, and wherein the first side, the second side, the third side, and the fourth side of the cover each have a thickness that is less than 1 mm.

6. An end cap in accordance with claim 5, further comprising at least one identifier on the end wall, wherein the at least one identifier includes at least one of a team name or a team color.

7. An end cap in accordance with claim 1, wherein the engagement member is arranged to extend on the inner surfaces of the cover.

8. An end cap in accordance with claim 1, wherein the cover is flexible and is constructed as a single piece.

9. An end cap in accordance with claim 1, wherein the cover is constructed of polyvinyl chloride and is transparent and flexible, wherein the engagement member is constructed of rubber, plastic, silicone, epoxy, or resin.

10. A kit including a plurality of end caps in accordance with claim 1, wherein the plurality of end caps comprises a first end cap having a first size and a second end cap having a second size, wherein the second size is larger than the first size.

11. A collectible card protective assembly comprising:
    a collectible card holder including a first side, a second side, a third side, and a fourth side collectively defining a pocket therebetween for receiving a collectible card, the collectible card holder having an open end for inserting the collectible card into the pocket; and
    the end cap of claim 1.

12. A collectible card protective assembly in accordance with claim 11, wherein the collectible card holder is sized to hold a plurality of collectible cards within the pocket.

13. A collectible card protective assembly in accordance with claim 11 further comprising at least one identifier on the cover, wherein the identifier is associated with the collectible card within the pocket of the collectible card holder to facilitate a person identifying the collectible card.

14. A collectible card protective assembly in accordance with claim 11, wherein the first side of the cover and the third side of the cover are configured to engage the first and third sides of the collectible card holder.

15. A collectible card protective assembly in accordance with claim 11, wherein the collectible card holder has a thickness from the first side of the collectible card holder to the third side of the collectible card holder in a range of 1 millimeter (mm) to 9 mm.

16. A storage system for collectible cards, the storage system comprising:
    a container sized to hold a plurality of collectible cards;

a plurality of collectible card holders, wherein each collectible card holder defines a pocket for receiving at least one of the collectible cards and has an open end for inserting the collectible card into the pocket; and a plurality of end caps, wherein each end cap of the plurality of end caps is configured to releasably attach to an associated collectible card holder of the plurality of collectible card holders and close the open end of the associated collectible card holder, wherein each end cap comprises:
- a cover for closing the open end of the collectible card holder, the cover including a first side, a second side, a third side, a fourth side, and an end wall, wherein the cover has a thickness from the first side to the third side in a range of 1 millimeter (mm) to 9 mm, wherein the first side, the second side, the third side, and the fourth side each have an inner surface; and
- an engagement member extending on the inner surfaces of the first, second, third, and fourth sides, the engagement member configured to engage the collectible card holder and releasably secure the cover to the collectible card holder,
- wherein the end cap prevents removal of the collectible card from the pocket when the cover is secured to the collectible card holder by the engagement member, and wherein the first side, the second side, the third side, and the fourth side are perpendicular to the end wall, wherein a length defined between the inner surfaces of the second and fourth sides is greater than a width defined between the inner surfaces of the first and third sides, and wherein the cover has a rectangular cuboid shape, and wherein the first side, the second side, the third side, the fourth side, and the end wall are flexible.

17. A storage system in accordance with claim 16, wherein the first side and the third side are configured to engage the first and third sides of the associated collectible card holder such that the cover extends across and covers the open end of the associated collectible card holder.

18. A storage system in accordance with claim 16, wherein each end cap of the plurality of end caps includes an identifier to facilitate a person identifying the collectible card within the pocket of the associated collectible card holder.

19. An end cap comprising:
- a cover including sides having inner surfaces and defining a cavity, wherein the cavity has a width defined between the inner surfaces, wherein the cover is flexible, and wherein the cover is constructed of polyvinyl chloride and is transparent; and
- an engagement member including a gasket that extends on the inner surfaces of the cover and continuously along an entire circumference of the cover, wherein the engagement member is constructed of rubber, plastic, silicone, epoxy, or resin, wherein the engagement member has a friction-creating surface for frictionally engaging a collectible card holder when the cover is positioned onto the collectible card holder, and wherein the engagement member prohibits water intrusion between the gasket and the cover.

20. An end cap in accordance with claim 19, further comprising at least one identifier on the cover, wherein the identifier includes a color.

* * * * *